Dec. 14, 1948.  C. E. NORTH ET AL  2,455,945
APPARATUS FOR BREAKING AND MAKING EMULSIONS
Filed Aug. 7, 1943  3 Sheets-Sheet 1
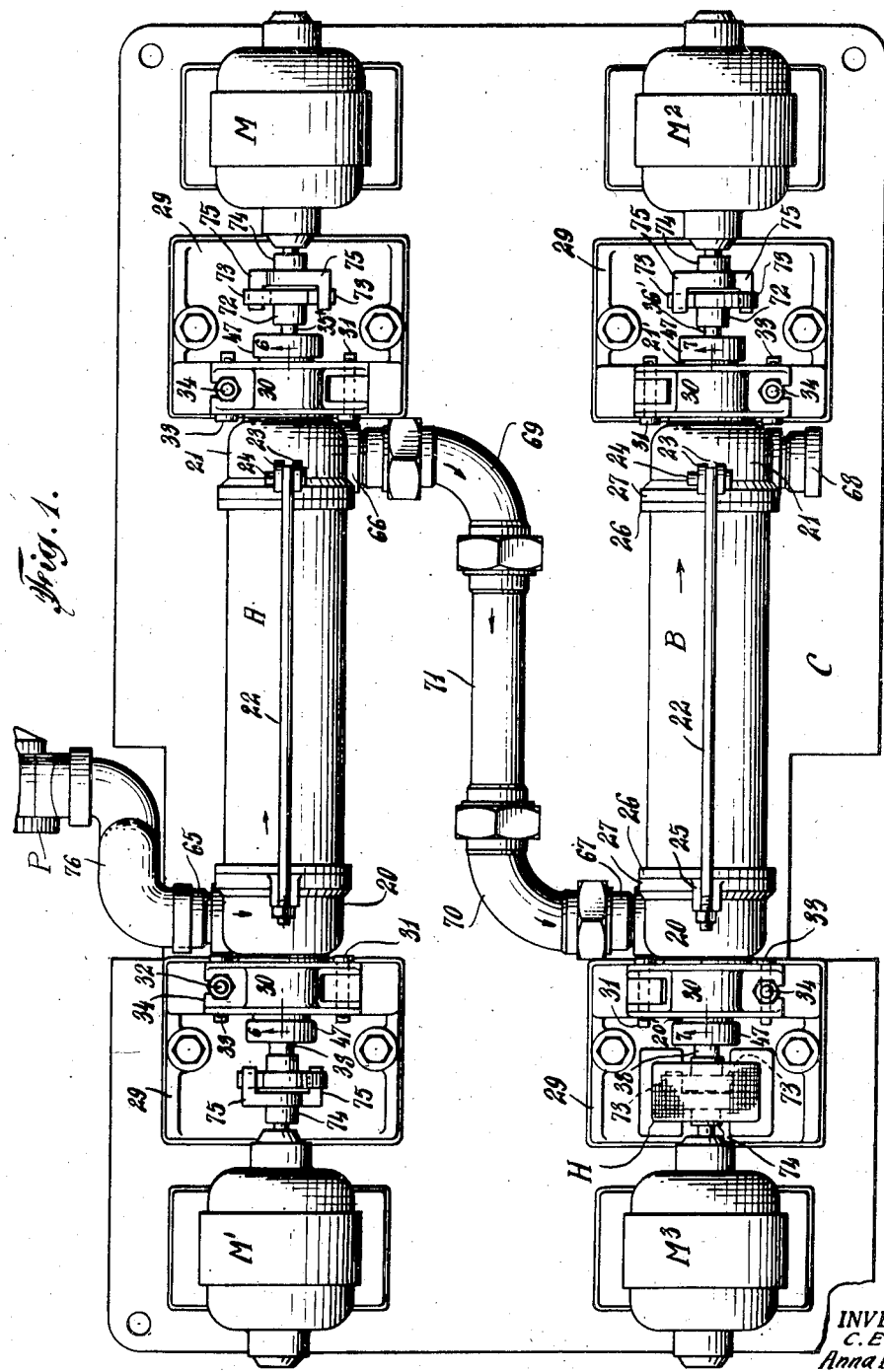
INVENTORS,
C. E. North
Anna P. North
BY
*John O. Seifert*
ATTORNEY

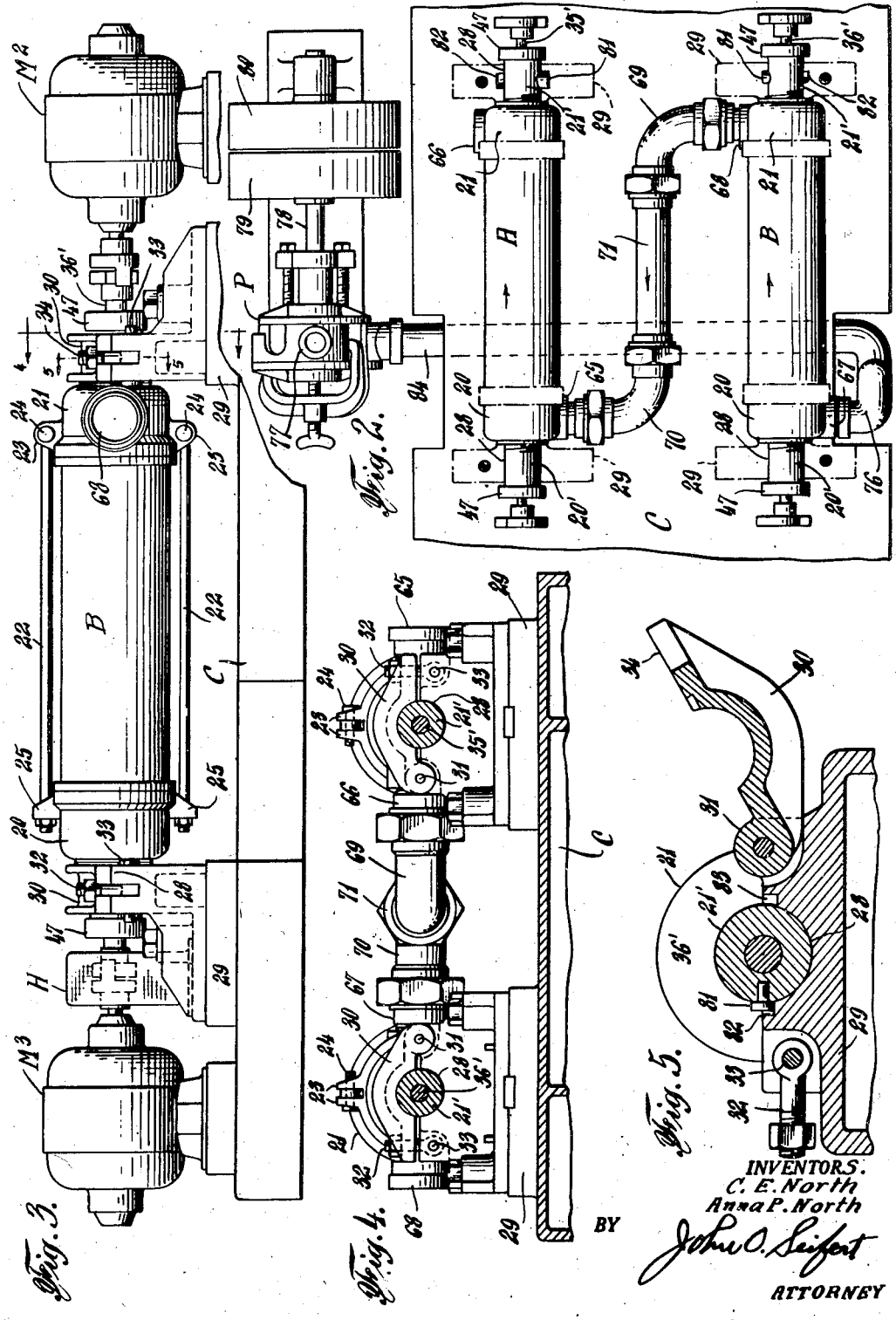

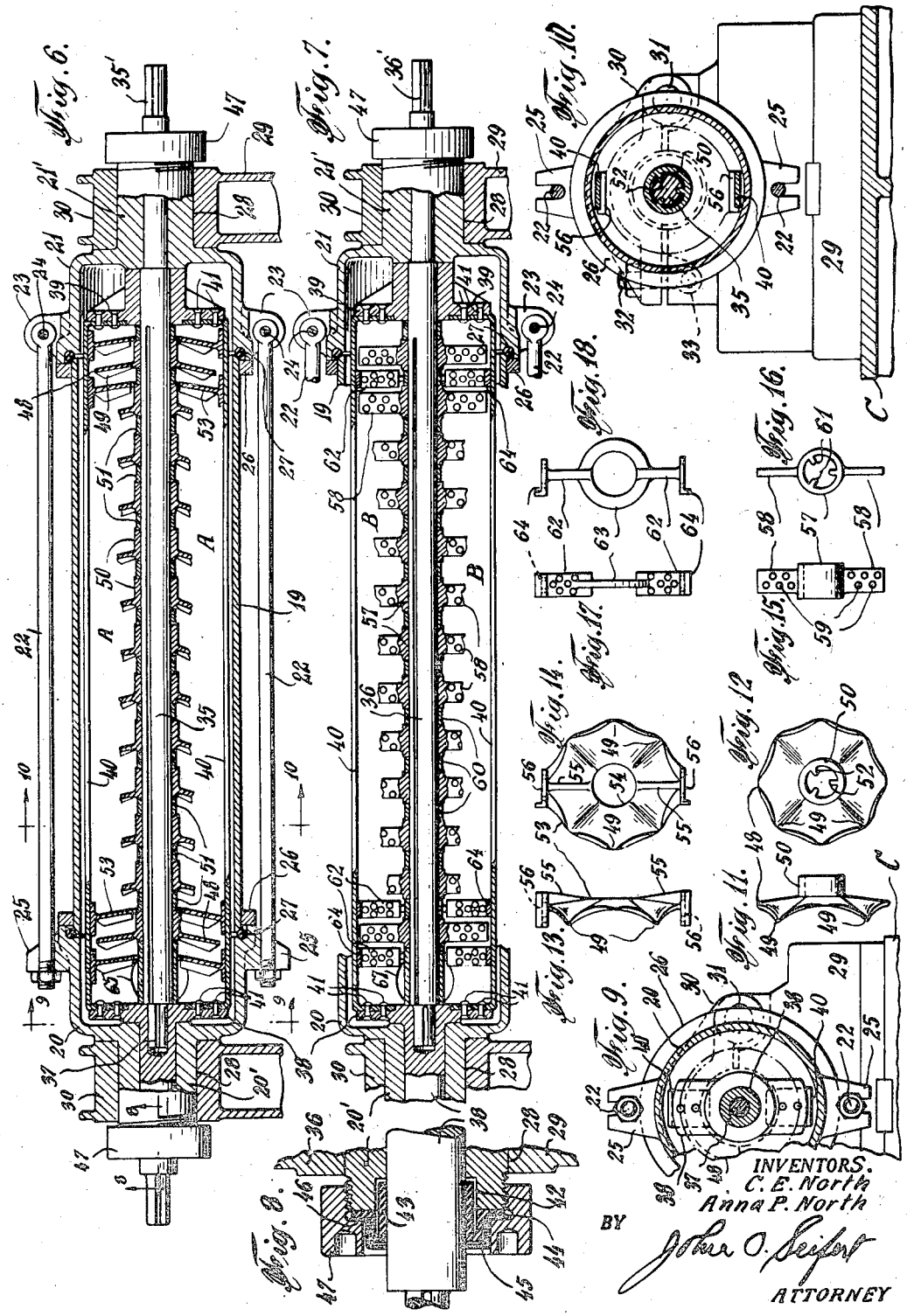

Patented Dec. 14, 1948

2,455,945

UNITED STATES PATENT OFFICE 2,455,945

APPARATUS FOR BREAKING AND MAKING EMULSIONS

Charles E. North and Anna P. North, Montclair, N. J.

Application August 7, 1943, Serial No. 497,794

9 Claims. (Cl. 259—64)

1

This invention relates to the breaking and making of emulsions.

It is an object of the invention to provide apparatus including a casing having a chamber therein with an inlet and an outlet at the opposite ends and contrivances rotatable therein operative to whip an emulsion passed through said casing chamber from the inlet to the outlet and agglomerate the fat globules in the emulsion into clusters, and while the apparatus is adapted for the breaking of any emulsion, it is particularly adapted for breaking an emulson of cream from milk passed through the casing chilled to a temperature suitable for agglomerating the fat globules of the emulsion into clusters to extract the milk fat from the cream.

It is another object of the invention to provide apparatus of this character adapted by the passing of a mixture of a fatty substance and an emulsifying agent through the casing chamber to make an emulsion, and while it is applicable for making various emulsions, it is particularly adapted for the making of reconstituted cream and/or milk by passing a mixture of milk fat, dried milk solids not fat, such as dried skim milk, and water through the casing chamber heated to a temperature not lower than the melting point of the milk fat, and the contrivances in the casing agitating the mixture to whip the same and break the fat content into minute fat globules, convert emulsifying agents of the dried milk solids not fat and water into a hydrophilic colloid and form the colloid as an adsorption film surrounding each fat globule and disposed in the interfaces between the globules and the serum in which the fat globules are suspended.

It is a further object of the invention to provide apparatus for breaking emulsions, and particularly for breaking an emulsion of cream from milk to extract the milk fat from cream in two stages, including a pair of cylindrical casings each having a chamber therein with an inlet in one end and an outlet in the opposite end, and means to connect the outlet of one casing chamber to the inlet of the other casing chamber, and one casing chamber having contrivances therein rotatable therein and operative to agitate and whip the emulsion, such as cream chilled to a temperature to adhere the fat globules to each other, passed through said casing chamber from the inlet to the outlet and cause the fat globules to attach themselves to each other and form clusters of fat globules, and the outlet of said casing chamber connected to the inlet of the other casing chamber to pass the whipped emulsion with the clus-

2 ters of fat globules from the first casing chamber into a second casing chamber from the inlet to the outlet, and said latter casing chamber having contrivances therein rotatable in opposite directions and operative to churn the whipped emulsion and break the film coating the fat globules and collect the fat of the clusters of fat globules into masses of fat and discharge the same from the outlet of the casing chamber with the residue of the emulsion.

Another object of the invention is to provide in apparatus of this character including a pair of cylindrical casings, interchangeable means for connecting the outlet of the first casing chamber having the contrivances therein for whipping the emulsion to the inlet of the second casing chamber and breaking an emulsion passed through said casing chambers, or connect the inlet of the first casing chamber to the outlet of the second casing chamber, and adapting the casings for passing therethrough in reverse direction a mixture of a fatty substance and an emulsifying agent, such as a mixture of milk fat, dried milk solids not fat, such as dried skim milk, and water heated to a temperature not lower than the melting point of the fat to produce an emulsion, the contrivances in the second casing chamber acting to produce a smooth and plastic mixture, and the whipping contrivances in the first cylinder acting to break the fatty content of the mixture into fat globules, convert the emulsifying agents of the dried skim milk and water into a hydrophilic colloid, and form the colloid as an adsorption film surrounding each fat globule and in the interfaces between the globules and the serum in which they are suspended.

Other objects and advantages of the invention will hereinafter appear.

In the drawings accompanying and forming a part of this application, there is illustrated an embodiment of apparatus for carrying out the invention, wherein Figure 1 is a plan view showing the casings connected for passing the emulsion therethrough to break the emulsion and extract the fat from the emulsion.

Figure 2 is a view similar to Figure 1, on a reduced scale, showing the casings connected for the passing of the materials of an emulsion therethrough to make an emulsion.

Figure 3 is a side elevation looking at the bottom of Figure 1.

Figure 4 is a cross sectional view taken on the line 4—4 of Figure 3.

Figure 5 is a cross sectional view taken on the line 5—5 of Figure 3 to show a cap member for retaining and supporting trunnions for the casings in a bearing support therefor.

Figure 6 is a longitudinal sectional view of one of the casings taken on the line 6—6 of Figure 1.

Figure 7 is a longitudinal sectional view of the other casing taken on the line 7—7 of Figure 1.

Figure 8 is a longitudinal sectional view taken on the line 8—8 of Figure 6 and showing a dust-proof bearing for the frames and shafts in the trunnions of the casings.

Figure 9 is a cross sectional view, partly broken away, taken on the line 9—9 of Figure 6.

Figure 10 is a cross sectional view taken on the line 10—10 of Figure 6.

Figure 11 is a side elevation and Figure 12 a front elevation of a disk of a series of disks mounted on the shaft in the casing shown in Figure 6.

Figure 13 is a side elevation and Figure 14 a front elevation of a disk of a series of disks secured to the frame in Figure 6 and alternating with the disks fixed on the shaft.

Figure 15 is a side elevation and Figure 16 an end elevation of paddles of a series of paddles mounted on the shaft, as shown in Figure 7, and Figure 17 is a side elevation and Figure 18 an end elevation of a paddles of another series of paddles alternately with the paddles shown in Figures 15 and 16, mounted on the frame in the casing shown in Figure 7.

The apparatus illustrated for carrying out the invention functions to perform the results of breaking and making emulsions by agitation in two stages. It is unique in the fact that the apparatus is operative to break emulsions by passing through the apparatus in one direction an emulsion chilled to a temperature suitable for adhesion of the fat globules, the emulsion is broken and the fat content of the emulsion agglomerated into masses of fat, such as butter in the case of an emulsion of cream from milk. By passing through the apparatus in reverse direction a mixture of the ingredients of an emulsion, such as milk fat, dried milk solids not fat, and water heated to a temperature not lower than the melting point of the fat, the fat content is broken into minute globules, the emulsifying agents of the dried skim milk solids not fat and water are converted into a hydrophilic colloid and the colloid formed as an adsorption film coating the fat globules and disposed in the interfaces between the fat globules and the serum in which the globules are suspended and produced an emulsion, such as cream.

While the apparatus is adapted for breaking different emulsions it is particularly adapted for breaking an emulsion of milk fat in natural cream from cow's milk, the efficiency of the apparatus depending upon the sequence of physical changes that must take place to change small fat globules dispersed in the cream into clusters of fat globules and agglomerate the fat of the fat globules into masses of fat. The cream to be treated must first be properly prepared if the treatment is to be most efficient and the product produced in capacity at a commercial rate. In many tests in the laboratory and in the factory made with apparatus of the present application, we have found that by using cream emulsions having a 33% fat content most efficient results are produced, although good results can be obtained from cream emulsions having a 30% to 40% fat content, and that there is some loss in efficiency in breaking cream emulsions having a lower or higher fat content.

The temperature of the cream as it is treated is an important factor. The breaking of the emulsion means the uniting of the dispersed fat globules with each other into clusters and the agglomerating of the fat globules into masses of concentrated fat, which requires that the fat shall be in a condition which is not too liquid and not too solid. It should be semi-solid and sticky so that when impact occurs between the fat globules they will adhere to each other. As the milk fat varies in its proportions of hard and soft fats and temperature affects the stiffness and hardness of fats, it is necessary to bring the fat to that temperature which is most favorable for adhesion of the fat globules into clusters and agglomerating of the clusters of the globules into masses of fat. A temperature which is correct for all creams and at all seasons of the year cannot be fixed. By many experiments we have found that cream at a temperature of 48° F. puts the fat in a favorable condition for treatment most of the time, although good results were obtained with cream having a temperature as low as 45° F. and as high as 55° F.

The fat globules are dispersed and held in suspension in the cream partly due to their small size. When they are reduced to a diameter of 5 mu or less the surface friction between the fat globules and the serum in which they are suspended is sufficient to overcome the differences in gravity between the fat globules and the serum to such an extent that the tendency of the fat globules to rise in the cream is reduced or entirely suspended. The fat globules are also held in suspension by what is called an "adsorption film" consisting of a hydrophilic colloid of emulsifying agents of milk solids not fat and water and forming an envelope or jacket around each globule and filling the spaces called "interfaces" between the convex surface of the fat globules and the concave surface of the hydrophilic colloid in which the globules are suspended. To break the emulsion these adsorption films must be broken so that the globules are free of interference by the film and one globule can attach itself or adhere to other globules when the globules come in contact. We have found that mechanical agitation is the most advantageous for breaking the adsorption film surrounding the fat globules.

The fluid character of cream is such that the apparatus for agitating and treating the cream must be such as to effect intimate treatment of all the particles of butter fat dispersed in the liquid. By the present apparatus there is an intimate and thorough agitation of all parts of the cream due to the impacts to which the fat globules are subjected and which serves to break the envelopes or adsorption films surrounding the fat globules, and thus releasing them from interference by said films. Also the impacts serve to drive the fat globules together so that they will stick and adhere to each other, forming larger and larger chains or clusters of fat globules and until agglomerated masses of fat are produced.

The embodiment of the invention illustrated for carrying out the invention is a continuation in part of the subject matter of invention of the application of Charles E. North, Serial No. 461,368, required to be divided out from said application, and comprises a pair of cylindrical casings A and B mounted upon a supporting base C in horizontal position, as shown in Figures 1 and 2, although the base may be mounted to support the casings in vertical position. Each of the casings, as shown in Figures 6 and 7, includes a body 19 having heads 20, 21 engaged upon the opposite ends and the heads drawn and secured to the ends of the body by a pair of tie rods 22 pivotally supported at one end between ears 23 extending diametrically opposite from the head 21 by a pin extended transversely of the axis of the cylinder engaging an eye at the end of the rods and bridging the spaces between and mounted at the opposite ends in the ears, as shown at 24. The opposite ends of the tie rods are adapted to be moved into and out of a recess extended laterally into lugs 25 extending diametrically opposite from the head 20, the free end of the tie rods being screw threaded for the threaded engagement of a nut in abutting relation to the lugs to draw the heads to the ends of the body and into engagement with abutments in the form of annular members 26 fixed on the ends of the body. The interior diameter of the heads is the same as that of the body, and the side wall is of increased thickness at the end and arranged with an annular recess for the engagement of an annular packing member adapted for engagement of the ends of the body and provide a liquidtight seat between the heads and the body, as shown at 27. Each of the cylinder heads is provided with an outwardly extending trunnion 20', 21' adapted to engage and be supported in a semi-circular bearing, as at 28, in an upwardly extending portion of brackets 29 mounted upon the base C and retained in the bearing by cap members 30 having a substantially semi-circular bearing to engage over the trunnions in opposed relation to the bearing 28, as shown in Figures 4 and 5, the cap members being pivotally mounted at one end, as at 31, on the trunnion supports to have adjustment on an axis extending parallel of the axis of the cylinders toward and away from the head trunnions, and releasably secured in position engaging over the trunnions by a bolt 32 pivotally mounted at one end on the trunnion supports, as at 33, and adapted to be moved into and out of engagement with a recess 34 in the end of the cap members opposite the pivot support thereof and securing the caps in position engaging over the trunnions by threading a nut onto the end of the bolts 32 in abutting relation to the recess portion 34 of the cap members and in opposed relation to the pivot support 33 of the bolts 32, as shown in Figure 4, the cap member being released and moved to position away from a trunnion in a support therefore, as shown in Figure 5.

Each of the casings A, B has a shaft 35, 36 journalled at a reduced end portion in the trunnion 21' of the casing heads 21 and extended therethrough with the projecting ends 35', 36' arranged for the connection of power means to rotate the shafts in one direction. The opposite end of said shafts have a pilot bearing, as at 37, in the trunnion or hub of a head 38 of a frame and journalled in and extended through the trunnion opening 20' of the casing heads 20 with the projecting end arranged for connection of power means to rotate the frame in a direction opposite to the direction of rotation of the shafts 35, 36. The opposite end of the frames is rotatably supported on the shafts 35, 36 by the trunnion of a head 39 at said end of the frame rotatably engaged upon said shafts, the frame heads being connected by a pair of flat bars 40 connected diametrically opposite to the frame heads 38, 39 by bending the ends of said bars at a right angle to the body thereof and securing them to the heads, as by riveting, as shown at 41.

The bearing of the reduced end of the shafts 35, 36 in the trunnion 21' of the casing heads 21 and of the trunnion or hub of the frame head 38 in the trunnion 20' of the casing head 20 are each provided with a dust seal, and as said dust seals are of the same construction description of one will suffice for all of said seals. As shown in Figure 8, the bore in the trunnions 20', 21' of the casing heads 20, 21 are of increased diameter at the outer end and form in conjunction with the portion of the wall bore engaging the trunnion of frame head 38 an annular recess, as at 42.

A tubular portion of a member 43 of suitable material is engaged upon the trunnion or hub of the frame heads 38 and the reduced end portion of the shafts 35, 36 with a portion of said members extended into the recess 42 and a portion extending from said recess is bent reversely upon itself and the extremity bent laterally to extend outwardly at a right angle to said reversely bent portion, as at 44, and disposed contiguous to the outer end of the trunnions 20', 21' of the casing heads 20, 21. An annular member 45 of suitable material having an end portion flanged inwardly and the opposite end portion flanged outwardly is engaged on the hub of the frame heads 38 in nested relation to the reversely bent and outwardly flanged portion 44 of the tubular member 43, with the outwardly flanged portions lying contiguous to each other and clamped between the end of the trunnions 20', 21' of the casing heads and a shoulder formed by a portion of reduced diameter, as at 46, of a nut 47 threaded onto the end of said trunnions 20', 21' of the casing heads, the nut being arranged for the application of a pin wrench to screw the nut onto and off from said trunnions, as clearly shown in Figure 8.

A series of disk members 48 (Figures 11 and 12) are mounted on and rotatable with the shaft 35 in the casing A, the disks being provided with radial corrugations or flutes 49 arranging the disks of dished form and the periphery of corrugated form. A hub 50 is extended axially from the convex surface of the disks opposite the dished or concave surface and whereby the disks are mounted on and spaced longitudinally of the shaft 35 and maintained in spaced relation by spacers or sleeves 51 on the shaft interposed between adjacent disks. The hubs of the disks are provided with inwardly extending projections or keys 52, shown as three in number, adapted to engage corresponding keyways in and extending longitudinally of the shaft 35 to connect the disks to the shaft to rotate therewith. A second series of disks 53 (Figures 13 and 14) similar to the disks 48 have an enlarged axial opening 54 whereby they are loosely engaged on the shaft 35 alternating with the disks 48. The disks 53 are arranged with diametrically oppositely extending ribs 55 extending from the opening 54 to the periphery of the disks and merge at the outer ends with flat portions 56 of right angle form in cross section to engage the flat bars 40 of the frame with the angle portion engaging a longitudinal edge of said bars and secured at said flat angle portions to the frame members by riveting or welding.

Two series of paddles are arranged on the shaft 36 in casing B with the paddles of one series alternating with the paddles of the other series. The paddles of one series of paddles, as shown in Figures 15 and 16, each comprise a hub 57 with flat paddles 58 extending diametrically from the hub and parallel with the axis of said hubs or shaft, the paddles being of slightly less width than the length of the hubs and provided with a series of perforations 59. The hubs of the one series of paddles are engaged on the shaft 36 in casing B and spaced longitudinally thereof by sleeves 60 engaged on the shaft in interposed relation to the paddle hubs, as shown in Figure 7. To connect the paddles 58 to the shaft to rotate therewith the hubs of said paddles are provided with an inwardly extending key or keys 61, shown as three in number, adapted to slidably engage in corresponding keyways extending longitudinally of the shaft 36. The other series of paddles 62 (Figures 17 and 18) extend diametrically opposite from a flat annular portion 63 the opening in which is of larger diameter than the shaft 36, or the spacing sleeves 63 engaged thereon, and are loosely engaged on the shaft 36 alternately with the paddles 58. The paddles 62 are secured at the outer end to the frame bars 40 to rotate with the frame. For this purpose the outer end of the paddles 62 is provided with a right angle portion 64 to engage the flat bars 40 of the frame with an angle portion disposed at a longitudinal edge of the bars and the paddles secured to the bars by riveting or welding.

Each of the casings A and B have an inlet at one end of the casing chamber and an outlet at the opposite end of the casing chamber. As shown in Figures 1 and 2 the inlet to the casing A is through the side of the casing head 20, as at 65, and the outlet is in the side of the casing head 21 diametrically opposite to the inlet, as at 66. The inlet to casing B is also in the side of the casing head 20, as at 67, and the outlet is in the side of the casing head 21 diametrically opposite the inlet, as at 68. As shown in Figure 1 the outlet 66 of casing A is connected in communication with the inlet 67 to casing B by elbows 69, 70 having one end coupled to the outlet of the casing A and to the inlet of the casing B and a conduit 71 connected with the elbows 69, 70. This means for connecting the outlet of casing A to the inlet of casing B is interchangeable to connect the outlet of casing B with the inlet of casing A for a purpose to be hereinafter described, in which case the elbow 69 is connected to the outlet 68 of casing B and the elbow 70 is connected to the inlet 65 of casing A, as shown in Figure 2.

The shaft 35 with the disks 48 mounted thereon is rotatable in one direction by a motor M operatively connected to the end 35' of said shaft projecting from the head trunnion 21' of casing A, and the frame 38, 39, 40 with the other series of disks 53 is rotated in a direction opposite to the direction of rotation of the shaft 35 in casing A by a motor M¹ operatively connected to the reduced end of the trunnion or hub of frame head 38 projecting from the head trunnion 20'. The shaft 36 with the paddles 58 mounted thereon is rotated in casing B in one direction by a motor M² operatively connected to the reduced end 36' of said shaft projecting from the head trunnion 21' of the casing B, and the frame 38, 39, 40 with the paddles 62 secured thereto is rotated in a direction opposite to the direction of rotation of shaft 36 by motor M³ operatively connected to the reduced end of the trunnion or hub of the frame head 38 projecting from the head trunnion 20' of casing B. The connections or couplings of the motors with the shafts and frames in both casings A and B are the same and description of one of said connections or couplings will suffice for all of said connections. As shown in Figures 1 and 3 each of said couplings comprises a member having a hub portion 72 whereby said member is engaged on and keyed to the projecting ends of the disk carrying shaft 35', the paddle carrying shaft 36' and to the projecting end of the trunnion or hub of the frame heads 38, and arms 73 extending diametrically oppositely from said hubs. The other member of the coupling comprises a member having a hub 74 engaged on and keyed to the driving shaft of motors M, M¹, M² and M³, and L-shaped arms 75 extend diametrically from the sub 74 with the L portion extending laterially of the arms and one engaging at one side of an arm 73 on the hubs 72 and the other L portion engaging at the opposite side of the other arm 73. The coupling members 72, 74 may be enclosed in housings H mounted on the brackets 29, as shown in Figures 1 and 3. The disk and paddle carrying shafts 35, 36 and the disk and paddle carrying frames are rotated through the motors at the rate of 1750 revolutions per minute, and said disk and paddle carrying shafts are rotated in a direction opposite to the direction of rotation of the disk and paddle carrying frames.

In breaking emulsions as of cream the outlet 66 of casing A is connected to the inlet 67 of casing B through the connecting elbows 69, 70 and conduit 71, as shown in Figure 1, the emulsion at a temperature of from 45° to 55° F. entering the casing A through the inlet 65 by gravity, or is fed through said inlet continuously into casing A by a pump, shown in a conventional manner at P, the outlet of which pump is connected by a suitable conduit 76 to the casing inlet 65 and having an inlet 77 connected to a supply of the emulsion. The pump (Figure 2) is shown as being of a rotary type used in the milk industry adapted to be readily disassembled for cleaning and after cleaning readily assembled. The pump is rotated from a suitable source of power, and while the shaft 78 of the rotor of the pump is shown as having a pulley 79 fixed thereon and a pulley 80 loose thereon for engagement of a belt to connect the pulleys to power means, the power means may comprise an electric motor having the driving shaft connected to the shaft of the rotor of the pump. The emulsion of cream entering the casing A builds up in a column therein and the column of cream is displaced from the inlet end to the outlet end of the casing by the entering of additional cream therein. The column of cream in the casing is agitated by the rotation of the disks 48, 53 and subjecting the same to a whipping action which is augmented due to the crimping of the peripheral portion of the disks retarding the flow of the cream radially outward relative to the disks transforming the cream into a whipped plastic state and impacting the fat globules against each other, thereby causing the fat globules to adhere to each other and uniting in chains or clusters. The whipped cream is in the nature of a pasty or plastic mass having a much greater viscosity than the fluid cream, the structure resembling a sponge-like mass in which the fat globules form a framework having many spaces therein occupied by the milk serum and forming a structure in which all of the milk serum is encased by the spongy mass, and the liquid cream is transformed into a semi-solid substance corresponding to a paste or dough which greatly facilitates the subsequent treatment of the whipped cream to agglomerate the fat of the fat globules into granules and masses of fat. Air may be entered through the inlet 65 into casing A simultaneously with the entering of the emulsion therein, and said air in case of a cream emulsion forms as air bubbles in the whipped cream, and the whipped cream corresponding in appearance and texture with ordinary whipped cream.

The whipped cream is displaced from the outlet of casing A into casing B through the inlet 67 thereto and builds up in a column therein, which column of whipped cream is displaced from the casing B from the inlet to the outlet end by entering therein additional whipped cream from the casing A, the paddles 58, 62 agitating the whipped column of cream and breaking the film coating of the clusters of fat globules and agglomerate the fat into masses of fat, the agglomerated fat and residue or buttermilk being discharged from the outlet of the casing B. The perforations in the paddles permit of the passage of the milk serum therethrough and facilitate the agglomerating of the fat globules into granules and masses of fat. The casing B with the paddles rotating therein is in the nature of a churn in that it collects or agglomerates the fat content of the whipped cream into masses of fat, and the residue or buttermilk may be washed and drained from the masses of the fat and run into a butter worker in which the masses of fat may be salted and worked by any conventional method or means for making butter.

To adapt the casings A and B for passing reversely therethrough the ingredients or materials for making an emulsion, such as concentrated milk fat, dried milk solids not fat and water, and make a cream emulsion, or reconstituted cream, the elbows 69 and 70 are disconnected from the outlet of casing A and inlet of casing B. The bearing caps 30 for the trunnions 20', 21' of the casing heads 20, 21 are released and the casing A rotatably adjusted to the right as viewed from the left in Figure 1, through 180° in its bearing supports 28 in the brackets 29, and the casing B is adjusted in its bearing supports 28 to the left through 180°, thereby positioning the casings with the side of the casing A having the inlet 65 and the side of the casing B having the outlet 68 in opposed relation, or adjusted from the positions shown in Figure 1 to the positions shown in Figure 2, when the elbow 69 is connected to the outlet 68 of casing B and the elbow 70 is connected to inlet 65 of casing A, the inlet 67 to the casing B constituting the inlet adapted for entering and passing the mixture reversely through the casing and the outlet 66 of casing A constituting the outlet for the emulsion. To limit the adjustment of the casings A and B headed pins 81 are fixed in the trunnions 21' of the heads 21 of the casings, as shown in Figures 2 and 5, and said pins are adapted to be engaged in a recess 82 in the bearing face 28 of brackets 29 in which the trunnions 21' of the heads 21 of the casings engage when the casings are adjusted to the positions shown in Figure 1, and to engage in a recess 83 when the casings are adjusted to the positions shown in Figure 2. In the adjusted position and connection of the casings A and B as shown in Figure 2 a mixture of the ingredients or materials for an emulsion is fed into the inlet 67 of the casing B by gravity or fed therein by the pump P connected to the source of the mixture. The connecting member 76 connected to the inlet 65 of casing A in Figure 1 is connected to the inlet 67 of the casing B in Figure 2 and the outlet of the pump connected to said member by a conduit 84.

For making the emulsion it is necessary that the materials be heated to a temperature not lower than the melting point of the fat, and while the apparatus is adapted for making different emulsions, it is particularly adapted for making cream and milk emulsions, such as reconstituted cream and milk, the materials of which consist of milk fat either in the form of butter, or concentrated milk fat, such as milk oil, an emulsifying agent, such as dried skim milk and water forming a mixture of said materials in the preparations of and corresponding with the formula of said materials in natural cream or milk. The mixture preparatory to passing it through the apparatus is heated to a temperature not lower than the melting point of the fat, or to a temperature of from 90° to 150° F., and is entered into the apparatus through the inlet of the casing B by gravity, or is fed into and through the apparatus by the pump P. The mixture entered into the inlet of the casing B builds up into a column in said casing and said column is displaced from the casing into and built up into a column in the casing A and displaced from said casing A through the outlet thereof by the continued entering of the mixture into the casing B through the inlet thereof, and to make the emulsion it is agitated in two stages in the casings B and A. The column of the mixture displaced in casing B is agitated by the action of the paddles 58, 62 thereon effecting a more intimate and uniform mixture of the materials and whipping the mixture forming a mixture of the consistency of whipped cream, and in said condition is displaced into the casing A wherein the mixture is agitated by the crimped disks 48, 53. The rotation of the crimped disks in casing A act to transform the whipped cream into a fluid cream, the intimate friction created by the crimped disks breaking the fat content of the mixture into minute fat globules and at the same time converting the emulsifying agents of the milk solids not fat and water into a hydrophilic colloid and forms said colloid as an adsorption film coating around each fat globule and filling the interfaces between the fat globules and the serum in which they are suspended, the discharged emulsion corresponding in every way with cream produced from natural milk, in which the size of the fat globules correspond to the average size of from 3 mu to 5 mu in diameter of the fat globules in natural cream.

The operation of the apparatus is very elastic as the ratio of melted fat to water and dried milk solids not fat may be varied within wide limitations, according to the formula for the cream desired, whether for light cream, heavy cream, or other purposes.

Should it be desired to make a milk emulsion there is provided a mixture wherein the proportions of the milk fat, dried skim milk and water correspond to the formula of said materials in natural milk, and the mixture is passed in reverse direction through the apparatus. However, for making a milk emulsion preferably a cream emulsion is first made as above described after which the proportionate portions of dried skim milk and water are added to the cream and the mixture passed through the apparatus a second time, producing reconstituted milk in which the cream will rise to the top of the milk the same as in natural milk.

Each of the casings may be provided with small valve controlled inlet pipes through which water for diluting purposes, or air, may be added to the mixture passing through the apparatus. Experiments have demonstrated that the injection of air under pressure into the casing chambers during the making of emulsions will increase the efficiency of the apparatus due to the producing of air bubbles. However, under ordinary conditions this is not necessary since the apparatus is very efficient to break emulsions without the addition of any air. In the case of making emulsions, occasion may arise to dilute the mixture by the addition of water during its passage through the apparatus. Under ordinary conditions in making the emulsion the mixture is sufficiently concentrated to make a cream emulsion or reconstituted cream, and when it is desired to make a milk emulsion, the reconstituted cream or cream emulsion, which may be effected as hereinbefore set forth, is diluted by adding to the cream emulsion the necessary quantity of dried skim milk and water corresponding to the formula of milk and again passing the same through the apparatus, or it may be made by diluting the cream emulsion by the addition of a solution of dried skim milk and water in the proper proportions corresponding to the formula of milk. However, special circumstances may arise which would make it desirable to dilute the cream emulsion during the making of the emulsion, in which case it may be conveniently done by injecting water under pressure into the casings through valve controlled inlets provided for said purpose.

The efficient operation of the apparatus depends not only on its mechanical features but on the temperature and rate of flow of the material through the apparatus, as well as the speed of rotation of the disks and paddles. It is, therefore, essential that the temperature and the rate of flow of the material through the apparatus, as well as the speed of rotation of the disks and paddles, be automatically regulated. Such regulation may be provided for by temperature responsive regulators, flow meters and regulators, as well as means to regulate the operation of the motors and pump. Automatic regulation of the temperature and flow of material through the apparatus, as well as regulating the speed of rotation of the disks and paddles and the actuation of the motors and pump constitute a part of this invention.

Having described our invention, we claim:

1. In apparatus for breaking emulsions, an elongated closed cylindrical casing having an inlet in one end and an outlet in the opposite end, two series of contrivances in and spaced axially of the casing with the contrivances of one series alternating with the contrivances of the other series and the two series of contrivances adapted to be rotated in opposite directions on the axis of the casing, and means connected to the inlet of the casing operative for continuously feeding the emulsion into a column in the casing, the contrivances in the casing adapted by the rotation thereof to whip the column of emulsion into a plastic state and agglomerate the fat globules of the emulsion into clusters, and the feeding of the emulsion into the casing displacing the column of emulsion in the casing as it is whipped and discharging the whipped emulsion with the agglomerated clusters of fat globules from the outlet of the casing.

2. Apparatus for breaking emulsions as claimed in claim 1, wherein the contrivances rotatable in opposite directions on the axis of the casing for breaking the emulsion, comprise radially corrugated and peripherally crimped disks, a shaft journalled at one end in the casing adapted for connection of power means to rotate the shaft and on which shaft one series of disks are fixed in axially spaced relation to rotate with the shaft, a frame having a trunnion at the opposite ends, one trunnion being journalled in the end of the casing opposite the end in which the shaft is journalled and adapted for connection of power means to rotate the frame and in which frame trunnion the opposite end of the shaft has a pilot bearing, and the trunnion at the opposite frame end journalled on the shaft, and the disks of the second series of disks loosely engaged on the shaft alternately with the disks fixed on the shaft and fixed at the periphery to the frame to rotate therewith.

3. In apparatus for extracting butter fat from cream, means operating upon a continuously moving column of cream to whip and agglomerate the fat globules in the cream into clusters including an elongated cylindrical casing having a chamber therein with an inlet for the cream at one end of the casing chamber and an outlet at the opposite end of the casing chamber, a series of radially corrugated and peripherally crimped dished disks rotatably supported in axially spaced relation in the casing chamber to rotate about the axis thereof, a second series of radially corrugated and peripherally crimped dished disks rotatably supported in the casing chamber in alternate spaced relation to the first series of disks to rotate on the axis of the casing chamber, means connected to the inlet of the casing chamber to continuously feed cream into a column in and displace the whipped column of cream from the inlet end to the outlet end of the casing chamber during the whipping operation and discharge the whipped cream and agglomerated clusters of fat globules from the outlet of the casing chamber, and means to rotate the two series of crimped disks in opposite directions.

4. In apparatus for extracting milk fat from cream, a casing having an elongated tubular body with heads connected to and closing the opposite ends and arranged with axial hollow trunnions, one of said heads having an inlet opening and the other head an outlet opening therein, a shaft rotatably supported at one end in and extended through the trunnion of one casing head, a frame having a head at the opposite ends, one head arranged with a hollow axial trunnion rotatably engaged upon the shaft in the casing, and the opposite head arranged with an axial trunnion rotatable in and extended through the trunnion of the other casing head and in which frame trunnion the opposite end of the shaft has a pilot bearing, a series of dished and radially corrugated and peripherally crimped disks fixed in axial spaced relation on the shaft with the concave surface of successive disks opposed to the convex surface of preceding disks, a second series of dished and radially corrugated and peripherally crimped disks loosely engaged on the shaft alternately with the disks fixed on the shaft and fixed at the periphery to the frame with the concave surface of said disks opposed to the convex surface of preceding disks fixed on the shaft, the end of the shaft projecting through the trunnion of the one casing head and the trunnion of the frame projecting through the trunnion of the other casing head being adapted for connection of power means to rotate the shaft and frame with the disks in opposite directions, and means connected to the inlet opening of the casing operative to feed cream chilled to a temperature of from 45° to 55° F. into the casing, the rotative action of the disks whipping the cream into a plastic state and agglomerating the fat globules of the cream into clusters and in conjunction with feeding the cream into the casing displacing the whipped cream in a column from the inlet end to the outlet end of the casing and discharging the whipped cream with the clusters of fat globules through the outlet opening.

5. In apparatus for breaking emulsions as claimed in claim 1, a second closed cylindrical casing having an outlet at one end and an inlet in the opposite end connected in communication with the outlet of the first casing for the passage of the whipped emulsion from the first casing into and through the second casing from the inlet to the outlet, and contrivances in and rotatable on the axis of the second casing operative to agitate the whipped emulsion and agglomerate the fat content of the whipped emulsion into masses of fat.

6. In apparatus for extracting butter fat from cream, a pair of closed cylindrical casings, each casing having an inlet in one end and an outlet in the opposite end, a conduit removably connected to and connecting the outlet of one casing to the inlet of the other casing, means connected to the inlet of the casing having the outlet connected to the inlet of the other casing operative for continuously feeding cream into a column in said casing and displacing the column of cream from said casing through the conduit into and from the other casing through the outlet thereof, two series of contrivances mounted in and spaced axially of each casing with the contrivances of one series alternating with the contrivances of the other series and each series of contrivances independently rotatable in unison on the axis of the casings, and power means connected to and adapted to rotate the two series of contrivances in each casing in opposite directions, the contrivances in the casing into which the cream is fed being constructed and arranged to whip the cream into a plastic state and agglomerate the fat globules in the cream into clusters, and the contrivances in the other casing constructed and arranged to agglomerate the fat of the cluster of fat globules in the whipped cream into granules and masses of fat.

7. Apparatus for extracting butter fat from cream as claimed in claim 6, wherein the contrivances in the second casing operative to agglomerate the fat of the clusters of fat globules into granules and masses of fat, comprise a shaft rotatable in said second casing, a series of flat paddles spaced longitudinally of and fixed to said shaft to extend radially from and parallel with the axis of the shaft, a frame rotatable in said casing chamber, a second series of flat paddles spaced longitudinally of and secured to said frame to extend radially inward from the frame and parallel with the axis of the casing chamber and disposed alternately with the paddles of the first series of paddles mounted on the shaft, and said shaft and frame adapted for connection of the power means to rotate the shaft and frame with the paddles in opposite directions.

8. In apparatus for extracting butter fat from cream, means to continuously feed and agitate the cream in successive stages, comprising a pair of closed casings each having a chamber therein, one casing chamber having an inlet for the cream at one end and connected at the opposite end in communication with one end of the second casing chamber and the latter casing chamber having an outlet from the opposite end thereof, contrivances in said casing chambers rotatable in opposite directions operative to whip the cream into a plastic state and agglomerate the fat globules into clusters in the cream in the first chamber and agglomerate the fat of the clusters of fat globules into masses of fat in the second casing, and means connected to the inlet of the first casing chamber for continuously feeding the cream into and displacing the whipped cream from the first casing chamber into and thereby displacing the cream with the agglomerated masses of fat from the outlet of the second casing chamber.

9. In apparatus for breaking and making emulsions, a pair of closed cylindrical casings, each casing having an inlet in the side wall adjacent one end and an outlet in a side wall portion diametrically opposite the wall portion with the inlet and adjacent the opposite end of the casings, a support in which said casings are mounted to extend in parallel relation and have independent limited rotative adjustment about their axes, said casings in one position of adjustment in the support being disposed with the side wall portion of the first casing having the outlet opposed to the side wall portion of the second casing having the inlet and in another position of adjustment disposed with the side wall portion of the first casing having the inlet opposed to the side wall portion of the second casing having the outlet, means to interchangeably connect the casings in communication with each other for the feeding of an emulsion in one direction through the casings in one position of adjustment thereof and feed the constituents of an emulsion in reverse direction through the casings in the other position of adjustment thereof, and means operative in the casings constructed and arranged to whip an emulsion into a plastic state fed in one direction through the casings and in successive sequence agglomerate the fat content of the emulsion into granules, and said means in the other position of adjustment of the casings and the feeding of a mixture of fat, an emulsifying material and water in reverse direction through the casings adapted to break the fat content of the mixture into coarse globules and in successive sequence break the coarse globules of fat into minute globules of fat and form the emulsifying material as a film surrounding the fat globules holding the same in suspension in the mixture.

CHARLES E. NORTH.
ANNA P. NORTH.

REFERENCES CITED

The following references are of record in the file of this patent:

UNITED STATES PATENTS

| Number | Name | Date |
|---|---|---|
| 1,372,172 | Larsen | Mar. 22, 1921 |
| 1,549,889 | Moore | Aug. 18, 1925 |
| 1,616,817 | Maxwell | Feb. 8, 1927 |
| 1,718,989 | Sydney | July 2, 1929 |
| 1,765,315 | Thompson | June 17, 1930 |
| 1,919,878 | Brownlee | July 25, 1933 |
| 2,032,201 | Davis et al. | Feb. 25, 1936 |
| 2,080,327 | McKinnis | May 11, 1937 |
| 2,092,992 | Thalman | Sept. 14, 1937 |
| 2,315,251 | Eppenbach | Mar. 20, 1943 |